Dec. 14, 1971  H. G. BURBIDGE  3,626,672
GAS SCRUBBER APPARATUS
Original Filed April 14, 1969  3 Sheets-Sheet 2

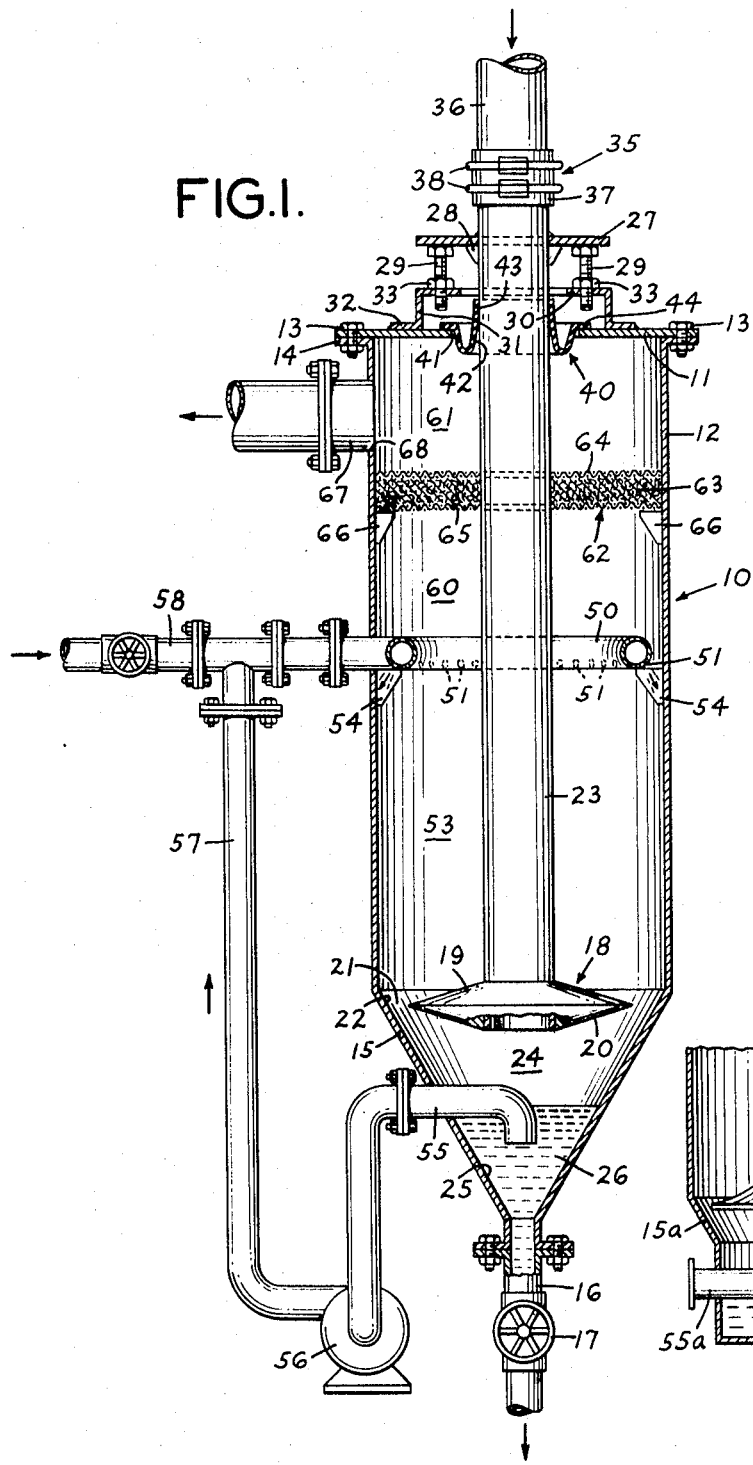

United States Patent Office 3,626,672
Patented Dec. 14, 1971

3,626,672
GAS SCRUBBER APPARATUS
Harrison Griffin Burbidge, Lachine, Quebec, Canada, assignor to Amercoat Corp., Brea, Calif.
Continuation of application Ser. No. 528,302, Feb. 17, 1966. This application Apr. 14, 1969, Ser. No. 817,269
Int. Cl. B01d *19/00*
U.S. Cl. 55—185                                3 Claims

ABSTRACT OF THE DISCLOSURE

A gas scrubbing device which includes means for spraying liquid downward within the device, means for introducing gas so that it flows upward in the device and is scrubbed by the liquid, and a disk valve adapted to form with an internal tapered wall portion of the device an orifice through which the gas flows upward, the disk valve being movable relative to the tapered wall portion by means outside the device to vary the effective size of the orifice, which in turn regulates gas flow within the device for maximum dispersion and hence maximum scrubbing efficiency.

---

This application is a continuation of my copending application Ser. No. 528,302, filed Apr. 14, 1969, now abandoned.

This invention relates, in general, to apparatus for the mixing together of two fluids, such for example as a liquid and a gas to create an environment favorable to the accomplishment of one or more desirable interactions between the fluids. More particularly, it relates to apparatus sometimes commonly referred to, in the parlance of the trade, as a gas scrubber, but it will be understood that this term "gas scrubber" is used herein primarily for convenience of description and not in a restrictive sense.

By use of apparatus constructed according to the invention, the mixing or contacting of fluids is effected in such a way that one is dispersed or atomized as very fine droplets into the other, so that there may be interchange between two fluids, of solid particles, liquid mists, or gaseous constituents, said interchange taking place in the direction desirable for one or more purposes, which, for example, may be removal of coarse or fine solid or liquid particulates by capturing them in the liquid; absorption or dissolving one or more components of a mixed gas stream into the liquid; desorption from liquid components which can be vaporized and carried away by a contacting gas stream; the exchange of heat between gas and liquid streams to produce either an evaporation of the liquid into the gas stream or a condensation into the liquid of a component or components of the gas stream; or for other like purposes.

In the prior art, there exists gas scrubber apparatus in which means are provided for dispersing or atomizing liquids wherein the dispersed condition is created by nozzles which spray the liquid at high pressure; the energy for doing this being provided by an external pump. There is also apparatus for dispersing liquid which depends upon moving mechanical equipment within the contacting device. However, the use of auxiliary equipment and nozzles, or moving mechanisms within the contacting device, has disadvantages. For example, if the mixing of a liquid and a gas is done for the purpose of removing solid particulate materials from the gas stream, as might be desirable to avoid air pollution by dust in a flue gas that is discharged into the atmosphere, the particles become suspended in the liquid and this may result in unwanted blocking of nozzles or wear of the mechanical equipment, thereby creating a need for frequent servicing and giving rise to undesirable maintenance costs. And the use of pumps to force liquids through nozzles, adds to the power requirements for effective fluid mixing and increases capital costs.

It is also known that for effective capture of solid or liquid particles carried in a gas stream, for example, mists of sulfuric acid in air ventilating tanks containing the acid, the droplets of an atomized liquid used for this purpose should have as high as possible velocity relative to the velocity of the particles to be captured. In such a system it is desirable that the liquid, at the time of atomization, be flowing counter-currently to the gas stream carrying the particles.

It is an object of this invention to provide an apparatus or system wherein means are provided for introducing the gas stream and the liquid stream into a vessel in a manner to provide flow of the gas stream and liquid stream in opposed directions under velocity controlled conditions through zones wherein the steps of mixing, separation and eventual removal of the liquid stream and gas stream are carried out. And if desired, the apparatus may be constructed so that the counter-current flow may be maintained through one or a number of successive stages prior to final separation and removal from the vessel, the successive stages including gas flow acceleration ports or orifices, and mixing zones.

It is a further object to provide apparatus including a vessel having means for accelerating the flow of the gas stream in a certain zone or zones of the vessel and for bringing the liquid and gas streams together at the place where the relative velocity of flow of one of the fluids with reference to the other is a maximum; and to provide means, if desired, whereby the two fluids, i.e., gas and liquid, may be separated and kept separate following intimate mixing. For example, the gas stream may be introduced into a zone wherein there is a mass or body of liquid, but where there is no, or substantially no turbulent intermixing, in which zone certain components of the one of the fluids may be removed from the other, followed by accelerated flow of the gas stream and turbulent intermixing with the liquid in a different zone and then separation of the gas from the liquid prior to discharge from the vessel, and, if desired, further means may be provided in the vessel for separation of fine entrained or residual mists from the gas stream prior to discharge from the vessel.

A further object is to provide annular port means providing an annular orifice through which the gas stream passes in a direction counter-current to the flow of the liquid, this port serving as an orifice, the area of which may be varied and controlled by valve means adjustable to vary the effective flow area of the orifice, thereby to vary and control the acceleration of the flow of the gas stream through the orifice; the means for adjusting the valve means being preferably accessible from outside the vessel. Also, it is an object to provide gas scrubber apparatus in which the means of mixing the liquid and gas streams can be arranged so that the efficiency of the interaction taking place as a result of mixing shall not be adversely influenced by variation in the mass flow rate of either fluid.

In accordance with one preferred form of apparatus embodying the invention, a vessel is provided through which the liquid and gas streams pass counter-currently, this vessel being preferably in the form of a generally cylindrical, vertically disposed tower having a gas inlet zone, a liquid collecting zone at its bottom end portion, in which the liquid introduced in the tower ultimately collects for discharge from the tower, and if desired returned to the tower; a tapered wall zone above the gas inlet and liquid collecting zones, in which tapered wall portion is positioned an adjustable valve means providing an annular port serving as an annular orifice at the periphery of the valve means and tapered wall; a liquid-gas intermixing zone above the valve means and tapered wall zone wherein a turbulent mixing and contacting of the liquid and gas is effected; a liquid distributor means in the tower in the upper portion of the liquid-gas intermixing zone through which liquid is introduced into the tower; a separating zone above the liquid distributor means; and a gas discharge zone above the separating zone; the gas discharge zone preferably being separated from the separating zone by mist eliminator means for removal of entrained mist from the gas stream prior to entering the gas discharge zone of the tower. If desired, more than one tapered wall zone with adjustable cooperating valve means may be provided in the same tower for multistage turbulent mixing of the gas stream and counter-current liquid stream.

Although the novel features which are believed to characteristic of the invention are pointed out in the annexed claims, the invention itself as to its objects and advantages and the manner in which it may be carried out may be better understood by reference to the following more detailed description taken in connection with the accompanying drawings, forming a part thereof, in which:

FIG. 1 is a sectional view in elevation of an apparatus embodying the invention, in which the gas stream is introduced through a conduit passing through the top wall of the tower, the conduit serving also as a valve stem which is adjustable vertically to adjust the position of the valve means in the tapered wall section of the tower;

FIG. 2 is a partial sectional view in elevation of a modified form of the lower portion of the tower, showing a different form of valve means;

Figure 3:
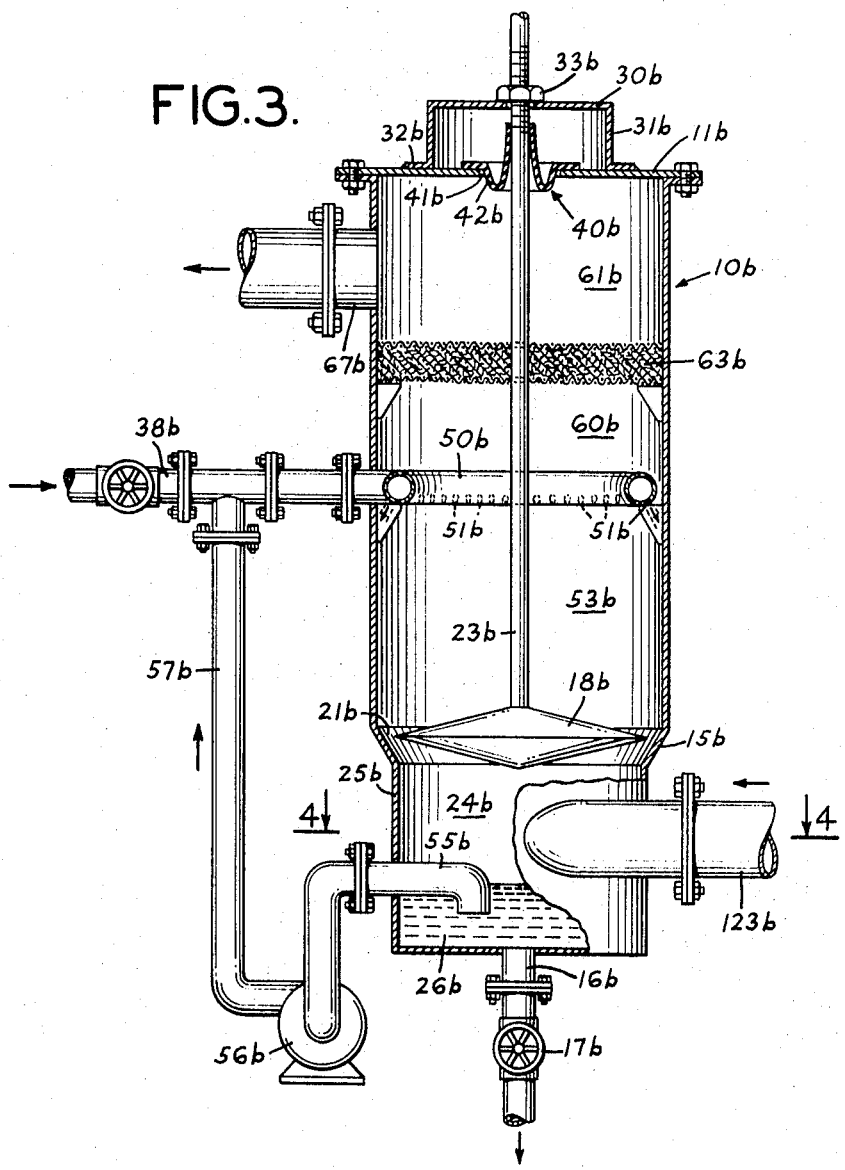
FIG. 3 is a view in elevation and partly in section, to illustrate a modified form, in which the gas stream is introduced through the cylindrical wall of the tower into the zone below the valve means through a conduit connected with a port in the cylindrical wall.

Referring now to the drawings in which like reference characters indicate similar parts throughout the several views, 10 represents a tower, which is shown is generally cylindrical in shape, having a top wall 11 removably secured to the upper end of the cylindrical portion 12, as by means of bolts 13 extending through an annular flange 14. The tower may be constructed of any suitable material, such as steel or other construction metals or of plastic materials, such as reinforced polyester, epoxy or furan resins or other corrosive resistant materials, it being understood that the selection of the material will depend primarily on the purpose of the apparatus and the use to which it is to be put.

In the apparatus illustrated in FIG. 1 the lower portion of the tower is conical in shape thus providing a peripheral tapered wall section 15, tapering inwardly in a downward direction. The lower end of the cone shaped section is connected to a drain pipe 16, having an openable and closeable valve 17 for draining out the tower 10 when desired. In certain instances this pipe may be used to introduce treating liquid into the tower, if desired. Mounted in the tower for vertical adjustment in the tapered wall section 15 is a valve means 18. This valve means is in disk form, having, as shown, a bevelled top face 19 and bevelled bottom face 20, the diameter of the disk valve being less than the diameter of the cylindrical portion 12 of the tower in a plane through the upper peripheral portion of the cone section but greater than the diameter of the lower portion of the tapered wall section 15. So it will be seen that if the disk valve 18 is raised, it will increase the annular area 21 between the periphery of the disk valve and the interior surface 22 of the upper end of the tapered wall section 15. Adjustment of the valve 18 upwardly will increase the annular area 21 and adjustment of the valve downwardly will decrease the annular area 21. This annular area 21 constitutes a port serving as an orifice, the effective area of which may be varied and adjusted by vertical movement of the valve means 18.

The valve 18 is fixed to the lower end of a centrally disposed conduit 23 which also serves as a valve stem. Hence, in this embodiment, the hollow valve stem also serves as a conduit for introducing the gas stream into the gas inlet zone 24, this zone being below the valve 18 and annular orifice 21. The bottom end of the tower 10 serves as a chamber 25 in which liquid 26 introduced into the tower, may be collected after passing downwardly through the tower. Liquid collecting in the collector chamber 25 may be removed and recirculated, if desired, as described in further detail hereinafter.

The conduit 23 extends upwardly through the top wall 11 of the tower and the arrangement is such that it can be raisde and lowered within limits to adjust one effective flow area of the annular orifice 21. The arrangement, as shown, for vertical adjustment of the hollow valve stem or conduit 23, comprises an annular flat ring platform 27 fixedly secured to the conduit 23 on reinforcing brackets 28; the platform resting upon a plurality of circumferentially spaced jack screws 29, extending through registering apertures in an annular platform 30 surrounding the conduit above the top wall 11. The stationary base platform 30 is carried upon an annular web 31 connected to a flange 32 secured to the top wall 11. The jack screws 29 are turnable in nut runners 33 which rest upon the stationary platform. Thus by turning the nuts 33 on their respective screws 29, the gas conduit 23, serving also as valve stem, may be vertically raised or lowered and adjusted to vary and control the flow area of the annular orifice 21.

A leak proof connecting joint 35 is provided at the upper end of the gas conduit 23 to permit it to be connected to a gas conduit 36, which may be connected to the source of gas supply. As shown, the connecting joint comprises a flexible collar 37 into which the end portions of conduits 23 and 36 may be inserted and then clamped in adjusted position by means of band clamps 38 around the collar in a manner to make a fluid tight and leak proof joint. The collar may be made of plastic, rubber, neoprene or any material suitable for the purpose.

Means are also provided for making a leak proof joint 40 between the top wall 11 of the tower and the outer surface of the valve stem or conduit 23, which permits vertical movement of the conduit through the central hole 41 in the top wall. As shown, this joint comprises a flexible sleeve 42 of suitable material such as rubber or neoprene or other flexible material suitable for the purpose. One end 43 of sleeve 42 is adhesively, or otherwise, secured to the outer surface of the conduit. The sleeve extends downwardly and is folded back on itself and flared outwardly to provide a flange portion 44 which may be adhesively, or otherwise, secured to the top wall in the area surrounding the hole 41. Other forms of joint such as a packing gland arrangement making a leak proof joint while permitting vertical movement of the valve stem or conduit 23 may be utilized in lieu of the arrangement as shown in the drawing. It will, of course, be observed that the passageway through conduit 23 extends centrally through the disk valve 18 and communicates with the gas inlet chamber 24, below the orifice 21.

Means are provided for introducing liquid, such as water, or other liquid as may be used for contacting and mixing with the gas stream passed through the scrubber tower. As shown, a distributor pipe in the form of a ring 50, having spaced holes 51 around its 360° length, is mounted to lie adjacent the interior surface of the cylindrical portion of the tower at a considerable distance above the orifice 21, thus to provide a zone 53 in which there is brought about a turbulent mixing of the gas stream and the liquid introduced through the distributor pipe 50. The distributor pipe may be carried on suitable spaced brackets 54 mounted on the wall of the tower. The holes 53 are positioned to direct liquid passing through them from the ring pipe so that they direct a shower of liquid toward the interior surface of the cylindrical wall to provide a sheet or film of liquid continuously flowing down the interior surface of the wall below the distributor 50, and so that the wall is kept continuously wet when water or other treating liquid is forced through the distributor 50, when the apparatus is in operation. Liquid may be supplied from a suitable source and pumped through valved pipe 58 through the distributor and, if desired, the liquid may be recirculated through the tower by a pipe 55 taking suction from the pool of liquid 26 which collects in the bottom of the tower, the liquid being pumped by pump 56 which discharges through return pipe 57 connected to the distributor 50.

A gas-liquid separating zone 60 is provided in the tower above the liquid distributor 50. And a gas discharge zone 61 is provided in the tower above the separating zone 60, these two zones being separated preferably by a mist eliminator 62.

Mist eliminators of various types are known in the art. It is a foraminous or porous device for providing tortuous flow and maximum surface for contact with the gaseous stream passing through it to cause entrained liquid mist to coalesce into droplets which fall by gravity back into the separator zone 60. As shown, the mist eliminator is corrugated metallic wire pressed into a mass 63 and held between a supporting mesh bottom screen 65 and a top screen 64, the device being mounted on spaced supporting brackets 66.

A gas discharge pipe 67 communicates with the discharge zone 61 through a port 68 in the cylindrical wall of the tower. The pipe 67 may be connected to other piping to convey the treated gas stream to atmosphere or to such place as may be desired.

The modification illustrated in FIG. 2 is in all substantial respects similar to FIG. 1, there being provided, however, a different shaped valve means 18a. In this modification the conduit 23a corresponding to conduit 23 of FIG. 1 is flared at its bottom end to provide an annular bell flanged disk valve 18a which is vertically adjustable in the peripheral tapered wall portion 15a, which is in the form of a truncated cone section 22a, the lower end of which terminates in a cylindrically shaped collector section 25a in which the liquid 26a passing downwardly through the tower may collect. A drain pipe and valve 16a and 17a are connected to the chamber 25a. The liquid 26a may be recirculated by taking suction through pipe 55a, as described in the foregoing. The effective flow area of the annular orifice 21a may be controlled and adjusted, as described in connection with the apparatus illustrated in FIG. 1.

One manner of operating the apparatus as illustrated in FIG. 1 may be as follows:

It may be assumed that it is desired to scrub a flue gas containing particulate material or contaminants such as dust particles to remove them from the gas stream to avoid air pollution when the gas stream is discharged into the atmosphere. However, it will be understood that this is only one of many purposes for which the apparatus of the invention may be used. In scrubbing flue gas to avoid air pollution and in circumstances where there is no desire to recover material removed from the flue gas stream, water or an aqueous solution will ordinarily be used as the scrubbing liquid. For purposes of description, it is assumed that water from a suitable source is used for scrubbing the flue gas. The water is forced through distributor pipe 50, the holes 51 being sufficiently large as not to impose an undue resistance to water flow therethrough. The water entering the tower through holes 51 will form a continuously and downwardly flowing film or sheet of water on the interior cylindrical wall surface of the zone 53 and water will flow downwardly along the wall and then through annular orifice 21 and will form a pool 26 in the bottom section of the tower. Meantime flue gas to be scrubbed, or treated, is passed through pipe 36 downwardly through conduit 23 into the gas inlet chamber 24. The gas stream will be constrained to change its direction of flow and will flow upwardly through the annular orifice 21. Such particles of sufficient mass, density and size to have requisite inertia will not reverse their direction of flow and will impinge on the surface of the liquid pool 26 and be captured thereby the liquid and will be removed with the liquid removed from the pool. And as stated hereinbefore, the liquid may, if desired, be recirculated through the tower. The gas stream flowing upwardly through the annular orifice 21 will meet and come in contact with water flowing downwardly through the orifice in counter-current direction.

The effective flow area of orifice 21 is adjusted, in a manner as described above, so that the flow of gas upwardly through the orifice is accelerated and the kinetic energy of the gas particles is increased. Some of the downwardly flowing water, as it meets the upwardly flowing gas, accelerated by passing through the orifice, will cause an atomization of some of the liquid and will cause water in the form of droplets of varying sizes to be carried upwardly in the scrubbing zone 53. Inasmuch as the velocity of the gas stream flowing in a generally upward direction is then reduced as it flows upward in the zone 53, which is of greater cross section than the area of the orifice, droplets of water or dispersed liquid droplets, coalesce and upon reaching varying heights fall again and coalesce with the water stream flowing downwardly along the cylindrical wall and through the orifice. The amount of water passed through the distributor 50 and the size of the effective flow area of orifice 21 and adjusted in relation to the amount of pressure of the upwardly flowing gaseous stream so that the scrubber zone 53 is in a condition which is herein called "flooded." That is, the term "flooded," as used herein, indicates a condition wherein a quantity of liquid is supported or buoyed up by the rising gas stream in the zone 53 confined by its cylindrical side wall in the scrubber sections of the tower, the said liquid being continually dispersed into fine droplets, which are moving in a state of turbulence, the droplets coalescing into larger droplets or agglomerates of larger dimension, the various droplets rising and then falling back, all of which as the gas flows in a generally upward direction are maintained in a state of high turbulence and are continually being dispersed, as they fall back toward the annular port or orifice 21. The state of this flooding is maintained in such condition that any liquid flowing down the wall of the tower and flowing into the zone of flooding will displace from the zone a substantially equal volume which will find its way down the surfaces of the walls of the scrubber zone through the annular opening 21, thence to the pool 26 of liquid in the bottom end of the tower, carrying with it particulate material captured from the gas stream. And it may be observed at this juncture that the zone 53 is free from packing rings or other fixed similar elements within the zone, as has been common in prior art devices to increase contact surface for gas and liquid contact, yet the continued dispersion of the liquid, carrying small droplets upwardly and coalescing the droplets to form larger ones which fall back in the rising gas stream, provides a system and condition which brings about a very efficient and effective intermixing and scrubbing to capture the particles and particulate material or unwanted contaminants from the gas stream and to carry them downwardly into the pool 26.

It is particularly significant to observe that the effective flow area of the annular opening 21 is adjustable so that change in mass flow rate of liquid or gas can be compensated. If the mass of gas should fall off with resultant falling off of kinetic energy of the gas at the orifice 21, an adjustment can be made of the effective flow area of the orifice to increase acceleration to maintain the desired flooded state in the scrubber or mixing zone 53 to maintain the efficiency of interaction. When desired, the rate of liquid flow through distributor 50 may be changed and adjusted. A change in effective flow area 21 will therefore compensate for variations of liquid or gas flow rates, to maintain optimum balance at all times between power consumption and efficiency of the desired interaction between the liquid and gas, and the change and adjustment may be made while the apparatus is in operation.

As indicated above, the velocity of droplets of liquid carried upwardly or buoyed up in the rising gas stream will decrease in upward velocity and will ultimately fall back by gravity into the mixing zone 53. The apparatus is adjusted so that any droplets carried upwardly in the gas stream above the distributor 50 into the separator zone 60 will have lost sufficient upward velocity head that gravity causes htem to fall downwardly so that any liquid in the gas stream entering into the zone of the mist eliminator 62 will be so finely dispersed that the liquid is either vaporous in the gas stream or in mist form. In passing through the mist eliminator, finely dispersed mist is caused to contact the exposed surfaces of the mist eliminator where they are coalesced into liquid droplets which fall downwardly in the tower with the result that the treated gas entering into the discharge zone is freed from the particulate material which was carried in the raw flue gas when it entered the tower and the discharged gas will be free of liquid droplets of discernible size.

The treated gas free from the unwanted dust and particulate material may then be discharged through gas discharged pipe 67 to atmosphere or to such place as may be desired.

It may be observed here that the modified apparatus illustrated in FIG. 2, wherein a different form of valve 18a is shown, may be operated in substantially the same manner as the apparatus illustrated in FIG. 1.

Figure 4:
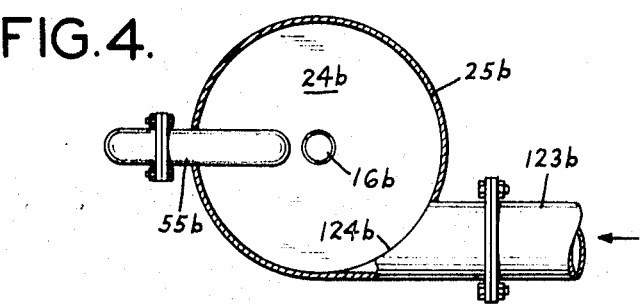
FIG. 4 is a sectional plan view of line 4—4 of FIG. 3.

The modification of the apparatus illustrated in FIGS. 3 and 4 is in many substantial respects similar to the apparatus shown in FIG. 1. Analogous parts bear the same reference characters as in FIG. 1, but the reference characters carry the sub-letter b. In this modification the tower 10b has a tapered wall section in the form of a truncated cone 15b terminating in a liquid collector section at the lower end of the tower which has a cylindrical side wall 25b; the distributor 50b and liquid recycle conduits 55b, 57b, and pump 56b being the same as similar parts in FIG. 1.

The disk valve 18b is mounted on the lower end of a centrally disposed valve stem 23b, which extends through an aperture 41b in the top wall 11b of the tower. In this instance, the valve stem is not hollow to provide a gas conduit as in FIG. 1. Gas to be treated is introduced into the gas inlet chamber 24b through a conduit 123b which connects with a port 124b in the cylindrical side wall 25b of the chamber 24b. It will be observed that the pipe 123b is joined to the cylindrical wall and the port 124b so positioned that gas enters the chamber tangentially and is thus constrained to flow around and sweep the inside surface of the cylindrical side wall, or more accurately stated, to sweep around in contact with the surface of liquid pool 26b and in contact with the film of liquid flowing down the inside surface of the liquid collector chamber from the annular orifice 21b when the apparatus is in operation so that heavier and denser particulate material carried with the gas stream entering the tower is captured by the liquid. The gas stream then passes upwardly through annular orifice 21b between the periphery of disk valve 18b and the inside peripheral surface of the truncated cone section 15b. Scrubbing or reaction liquid is forced through distributor 50b as described in connection with FIG. 1 and the scrubbing zone, or liquid-gas mixing zone, 53b is kept in flooded condition as previously described. The liquid droplets and gas are separated in separator zone 60b as the gas stream rises and droplets of liquid fall back by gravity and the gas stream then passes upwardly through mist eleminator 63b into gas discharge zone 61b and the treated gas stream then is discharged through discharge pipe 67b to such place as may be desired.

The arrangement, as shown, for raising and lowering the valve means 18b and hence to adjust and control the effective flow area of the annular port or orifice 21b, comprises a stationary platform 30b, supported above the aperture 41b in the top wall of the tower on a ring web 31b and out-turned flange 32b which is fixedly supported on the top wall. The upper end of the valve stem 23b is threaded. A threaded runner nut 33b turnable on the stem and resting on platform 30b provides means for vertically adjusting the stem and hence adjusting the position of valve 18b upwardly or downwardly to its proper relations with the truncated cone portion 15b. A flexible fluid tight joint 40b is provided around the valve stem 23b by a flexible sleeve 42b in similar manner as the liquid tight joint 40 in the apparatus illustrated in FIG. 1. Except for introducing the gas through pipe 123b tangentially into chamber 24b instead of downwardly through hollow stem 23, as illustrated in FIG. 1, the operation of the apparatus illustrated in FIGS. 3 and 4 is substantially the same as that described in connection with the operation of the apparatus illustrated in FIG. 1.

Figure 5:
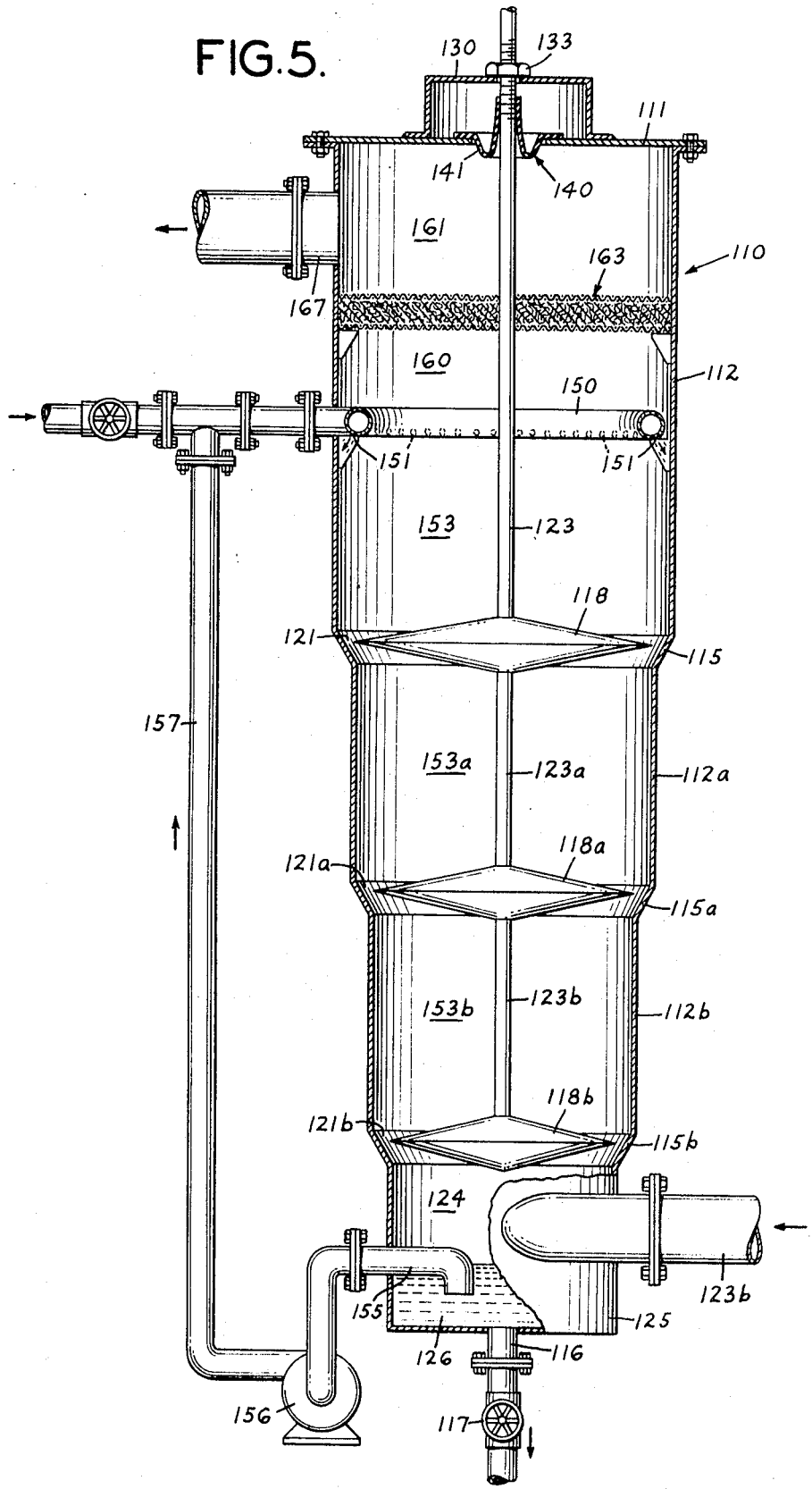
FIG. 5 is a view in elevation and for the most part in section of a modified form arranged for multistage intermixing of the liquid and gas streams.

In FIG. 5 there is illustrated an apparatus embodying the invention adapted for multistage intermixing of the liquid and gas streams or for a multistage gas scrubbing operation. The tower 110 is provided at its upper end portion with a gas discharge section 161, a mist eliminator 163, a liquid-gas separator section 160, a liquid distributor 150 having circumferentially spaced holes 151, an upper gas-liquid mixing or scrubber section 153, a tapered wall or truncated cone section 115, in which is disposed a vertically adjustable valve means 118 having a stem 123 extending through the top wall 111 and provided with a threaded portion on which is a turnable nut 133 resting upon a stationary platform 130 carried by the top wall and a flexible fluid tight joint 140 and a gas discharge pipe 167. It may be observed that the upper portion of the tower is the same shape and construction as the upper portion of the tower illustrated in FIG. 3. Likewise, the lower end portion of the tower 110 is similar in construction as the corresponding lower end portion of the tower illustrated in FIG. 3. It has a gas inlet zone 124 having a cylindrical side wall 125 providing a liquid collector chamber, a gas introducing pipe 123b communicating with the gas inlet zone in the manner described in connection with FIG. 3, and a similar liquid recirculation system comprising pipe 155 taking suction from liquid pool 126, pump 156 and conduit pipe 157 through which the liquid is passed back to the distributor 150. However, in the modification, as illustrated in FIG. 5, there are provided a plurality gas-liquid mixing or scrubbing sections 153a, 153b below the uppermost scrubber section 153 and above the gas inlet and liquid collector section 124. The uppermost mixing or scrubber section 153 has at its lower end a peripheral tapered wall or truncated cone portion 115 and a cooperating vertically adjustable valve 118 disposed therein. The next lower mixing or scrubber section 153a, which is of a diameter less than the overlying section 153, has a peripheral tapered wall or truncated cone portion 115a at its lower end and a cooperating vertically adjustable valve 118a disposed therein, this valve having a centrally and vertically disposed stem portion 123a which is an extension of stem portion 123. The lowermost mixing or scrubber section 153b extends downwardly from tapered wall portion 115a and is of a diameter less than the diameter of its overlying section 153a. This scrubber section 153b has a peripheral tapered wall or truncated cone section 115b at its lower end and the tower terminates in the gas inlet and liquid collector section 124 at the bottom end of the tower as described hereinbefore. The truncated cone section 115b has a cooperating valve 118b secured to the lower end portion 123b of the vertically disposed stem.

Bearing in mind the preceding description of the apparatus disclosed in the other figures, it will be seen that the effective flow areas of the annular orifices 121, 121a and 121b may be varied and controlled by raising or lowering the valve stem 123 in the same manner as previously described. However, the upwardly flowing gas stream and the counter-currently flowing liquid gas stream, passing through the tower, is given turbulent mixing in three stages, first in section 153b, then in 1953a, and finally in the uppermost section 153, and then the gas and liquid droplets carried upwardly in mixing or scrubbing zone 153 are separated in separator zone 160 and drop back. The gas stream then passes through mist eliminator 163 into discharge zone 161 and the treated gas stream is discharged through discharge pipe 167 to such place as may be desired.

In the foregoing, the operation of the apparatus has been described particularly in connection with scrubbing a flue gas to avoid air pollution to illustrate one manner of operation, but it will be understood that the apparatus is adapted to be used for other purposes as mentioned at the outset.

The terms and expressions which have been employed herein are used as terms of description and not of limitation, and there is no intention, in the use of such terms and expressions, of excluding any equivalents of the features shown and described or portions thereof, but it is recognized that various modifications are possible within the scope of the invention claimed.

I claim:

1. Apparatus for mixing a gas stream and a liquid stream for interaction between said gas and said liquid and thereafter separating the gas from the liquid, said apparatus comprising:
   a cylindrical tower having an inner cylindrical wall, a bottom wall and a top wall;
   a generally centrally located aperture disposed in said top wall;
   said bottom wall forming a liquid collection chamber disposed at the lower end of said tower and a gas inlet zone disposed in said tower above said liquid collection chamber for receiving the gas passed into said tower, said collection chamber having a drain in fluid communication therewith;
   said gas inlet zone having a peripheral tapered first wall portion at the upper end thereof;
   vertically adjustable disk-like valve means having its periphery positioned within said tapered wall portion of said gas inlet zone to provide an annular opening between said valve means and said tapered wall portion, a valve conduit integral with said disk-like valve means, said valve means surrounding the lower end of said conduit with the upper end thereof extending through the aperture in said top wall and out of said tower and into fluid communication with a gas-carrying conduit for introducing gas down said conduit and into said valve means and thus into said gas inlet zone;
   a flexible leak-proof connecting collar means carried by the upper end of said valve conduit coupled to said gas conduit to form a fluid-tight connection therebetween, said collar means having end portions into which the connecting ends of both said gas conduit and said valve conduit telescope to thereby form said fluid-tight connection, and clamping means associated with said collar means for clamping the connecting ends of both said gas conduit and said valve conduit within said collar means;
   sealing means associated with both the aperture in said top wall and said valve conduit for sealing said valve conduit to said top wall at said aperture in a leak-proof manner;
   said annular opening serving as an annular orifice through which gas flows upwardly within said tower from said gas inlet zone;
   means associated with said valve means for vertical adjustment of said valve means accessible from outside of said tower for varying the effective flow area of said orifice;
   said vertical adjustment means including means secured to the end of said valve conduit extending out of said tower for raising and lowering said conduit to thereby vertically adjust the height of said valve conduit within said tower;
   a second cylindrical wall portion within said tower forming a gas-liquid mixing zone within said tower and above said orifice, said first wall portion being in the general shape of the frustum of an inverted cone, said first and second wall portions being positioned at an obtuse angle to each other, and the edge of said disk-like valve means being positioned immediately beneath the junction of said first and second wall portions;
   liquid distributor means disposed in said tower at the upper end portion of said gas-liquid mixing zone for introducing liquid into said mixing zone and from which the liquid flows downwardly countercurrently to the upper flow of said gas stream and through said annular opening to said liquid collection chamber;
   said liquid distributor means including a generally ring-shaped hollow liquid distributor pipe having a plurality of aperture means extending circumferentially thereof for directing liquid downwardly outwardly against the inner cylindrical wall of said tower to form a liquid mist which rebounds inwardly and downwardly into the turbulent gas stream above said disk-like valve means, said annular opening being sufficiently small so that portions of the liquid stream flowing through said opening are entrained into said gas flow and become intermixed therewith, said liquid distributor pipe being supported on the inner wall of said tower by means mounted on the inner wall thereof, a liquid inlet pipe in fluid communication with said liquid distributor pipe, a liquid recirculation pipe in fluid communication with both said liquid collection chamber and said liquid inlet pipe, and means associated with said recirculation pipe for recirculating liquid from said collection chamber back into said liquid distributor pipe;
   a gas-liquid separating zone within said tower and above said mixing zone;
   a gas discharge zone disposed in said tower above said separating zone and in fluid communication therewith;
   means defining a passageway associated with said gas discharge zone for discharging gas therefrom; and
   mist eliminator means mounted in said tower between said gas-liquid separating zone and said gas discharge zone in said gas-liquid separating zone.

2. The apparatus of claim 1 wherein said disk-like valve means comprises a pair of generally frusto-conical surfaces, one inverted and one upright, joined along their perimeters of maximum diameter to form a sharp annular peripheral edge, the upper surface being secured to said valve conduit.

3. The apparatus of claim 1 wherein said valve conduit is outwardly flared at its lower end to thereby form said disk-like valve means.

References Cited

UNITED STATES PATENTS

| | | | |
|---|---|---|---|
| 115,572 | 6/1871 | Clark | 261—120 X |
| 1,235,231 | 7/1917 | Nathan | 261—153 |
| 1,411,950 | 4/1922 | Wyatt | 261—120 |
| 2,316,491 | 4/1943 | Teichner | 261—112 |
| 2,387,345 | 10/1945 | Pearl | 55—223 X |
| 2,643,867 | 6/1953 | Schneible et al. | 261—112 X |
| 3,045,990 | 7/1962 | Keenan, Jr. | 261—120 |

FOREIGN PATENTS

| | | |
|---|---|---|
| 303,778 | 2/1918 | Germany. |

DENNIS E. TALBERT, Jr., Primary Examiner

U.S. Cl. X.R.

23—2 R, 274; 55—226, 229, 238, 239, 240, 249, 252, 259, 267; 110—119; 159—4 CC, 13 C; 165—60, 96, 114; 261—36, 79A, 109, 111, 117, 126; 266—15